United States Patent [19]
Gasse et al.

[11] Patent Number: 5,975,407
[45] Date of Patent: Nov. 2, 1999

[54] METHOD USING A THICK JOINT FOR JOINING PARTS IN SIC-BASED MATERIALS BY REFRACTORY BRAZING AND REFRACTORY THICK JOINT THUS OBTAINED

[75] Inventors: Adrien Gasse, Grenoble; Gisèle Coing-Boyat, Sassenage; Gérard Bourgeois, Engins, all of France

[73] Assignee: Commissariat a l'Energie Atomique, Paris, France

[21] Appl. No.: 08/868,146

[22] Filed: Jun. 3, 1997

[30] Foreign Application Priority Data

Jun. 12, 1996 [FR] France .................................. 96 07291

[51] Int. Cl.$^6$ ............................ B23K 31/02; C22C 29/00
[52] U.S. Cl. ................... 228/121; 228/124.5; 228/248.5; 420/578
[58] Field of Search ................................. 228/121, 122.1, 228/248.1, 248.5, 124.5; 420/578; 428/698, 469, 627; 423/324

[56] References Cited

U.S. PATENT DOCUMENTS

| | | |
|---|---|---|
| 3,813,759 | 6/1974 | Heap et al. . |
| 4,499,360 | 2/1985 | Röttenbacher ........................ 219/85 H |
| 5,447,683 | 9/1995 | Montgomery et al. . |

FOREIGN PATENT DOCUMENTS

| | | |
|---|---|---|
| 0 100 835 | 2/1984 | European Pat. Off. . |
| 0 135 603 | 4/1985 | European Pat. Off. . |
| 0 633 093 | 1/1995 | European Pat. Off. . |

OTHER PUBLICATIONS

W. Tillmann, et al., DVS Verlag GmbH, pp. 110–115 1995, "Possibilities of Production of High Temperature Resistant Bonds to Non–Oxide Engineering Ceramics Using Various Brazing Concepts" *(With Partial English Translation).

E. Lugscheider, et al., BABS $6^{th}$ International Conference, pp. 1–16, Sep. 3–5, 1991, "Development of New Active Filler Metals for Joining Silicon Carbide and –Nitride".

M. Naka, et al., ISIJ International, vol. 30, No. 12, pp. 1108–1113, 1990, TI–Precoating Effect on Wetting and Joining of Cu to SiC.

J.K. Boadi, et al., Journal of Materials Science, vol. 22, pp. 2431–2434, 1987, "Brazing of Pressureless–Sintered SiC Using Ag–Cu–Ti Alloy".

S. Kalogeropoulou, et al., Acta metall., mater., vol. 43, No. 3, pp. 907–912, 1995, "Relationship Between Wettability and Reactivity in Fe/SiC System".

*Primary Examiner*—Patrick Ryan
*Assistant Examiner*—Kiley Stoner
*Attorney, Agent, or Firm*—Oblon, Spivak, McClelland, Maier & Neustadt, P.C.

[57] ABSTRACT

A method of joining at least two parts in silicon carbide based material by refractory brazing in which these parts are brought into contact with an intermetallic braze alloy and said parts and braze alloy are heated to a braze temperature equivalent to the melting temperature of the braze alloy in order to form a refractory joint characterized in that the intermetallic braze alloy comprises 1 to 18% by weight of cobalt and from 82 to 99% by weight of silicon, and in that the joint obtained is a thick joint, that is to say with a thickness of generally from 0.1 to 0.5 mm, and a thick refractory joint obtained by this method, wherein bonds of silicon carbide parts with thick joints prepared using the method of the invention allow the production with great precision of structures, apparatus and components with complex shapes having high temperatures of use reaching as high as 1000° C. and even higher.

12 Claims, 2 Drawing Sheets

— 0,1 mm

METHOD USING A THICK JOINT FOR JOINING PARTS IN SIC-BASED MATERIALS BY REFRACTORY BRAZING AND REFRACTORY THICK JOINT THUS OBTAINED

The present invention relates to a method for joining parts in silicon carbide based materials by refractory brazing using an intermetallic Co—Si braze alloy in order to produce components entirely in silicon carbide, and to the refractory thick joint thus obtained.

The term "silicon carbide based materials" is generally understood to mean all materials whose SiC content is 80% by weight or more.

The technical field of the invention may be defined as high temperature brazing, that is to say which uses temperatures that are generally over 1200° C., allowing the joints obtained to be used in applications requiring temperature rises which may for example exceed 900° C. reaching as high as 1000° C. and even beyond.

As for all ceramics, it is generally difficult to manufacture parts of complex shape with siliconbased compounds such as silicon carbide.

It is therefore often preferable to manufacture structures using ceramic parts of simple shape, and subsequently to join these parts in order to achieve the final structure.

Owing to the high temperatures, for example in the region of 1000° C., used in applications of ceramics such as silicon carbide, joining these ceramics by gluing with organic products is excluded.

Also, conventional joining techniques by welding using a power beam with or without filler metal (tungsten inert gas welding(TIG), electron or laser welding) implying partial fusion of the parts to be joined cannot be used for joining ceramics since it is not possible to melt a ceramic substrate or part and because in particular silicon carbide dissociates before melting.

Consequently, solid phase diffusion welding, joining-sintering and reactive brazing are currently the most frequently used techniques to carry out refractory joining of ceramics.

Welding by solid phase diffusion and joining-sintering have the disadvantage of being restrictive regarding their implementation.

For solid phase diffusion welding, the shape of the parts must remain simple if uniaxial pressing is used, otherwise complex tooling and preparation are required comprising for example the making of a casing, sealed closing in a vacuum, hot isostatic compression, final machine-finishing of the casing if Hot Isostatic Compression (HIC) is used.

For joining-sintering, the same problems arise (shape of parts, complex implementation) with in addition the need to control the sintering of a filler powder to be inserted between the two materials to be joined.

These two techniques also require the use of long heating stages (one to several hours) at high temperature since the processes involved use solid phase diffusion; these long periods may contribute to grain enlargement of the refractory alloys making them fragile.

Reactive brazing is a cheap technique, easy to set in operation which is the most commonly used. Parts of complex shape may be made using capillary brazing and operations are restricted to placing the filler metal between or next to the joint and melting the braze alloy.

Ceramic brazing has to overcome the fundamental problem of the poor wetting of ceramics by metals. This problem is overcome by selecting particular alloy compositions and/ or by optionally adding a reactive element as is precisely the case for reactive brazing.

For this latter technique a metal alloy composition is used, most often copper and silver based to which is added a reactive agent such as Ti, Zr, V, HF, Nb . . .

The reactive element acts by dissociating the surface of the ceramic and reacting with the latter to form a very stable nitride, oxide, silicide or carbide compound depending upon the nature of the ceramic involved. This very stable compound layer offers properties analogous to metals and therefore allows very good wetting of the ceramic and satisfactory adhesion to the latter.

Document EP-A-0 135 603 (GTE Products Corporation) thus describes a ductile brazing alloy comprising from 0.25% to 4% of a reactive metal selected from titanium, vanadium, zirconium, and their mixtures, from 20 to 85% of silver, from 1 to 70% of copper or aluminium, and from 3 to 30% of palladium.

The document published by E. Lugscheider and W. Tillman "Development of New Active Filler metal for Joining Silicon Carbide & Nitride"—Babs $6^{th}$ International Conference, Sep. 3–5, 1991, Stratford-upon-Avon— indicates that ceramics of non-oxide type such as $Si_3N_4$ and SiC may be joined together using braze alloys containing copper, silver and a reactive metal selected from titanium, zirconium, hafnium or niobium.

The document by W. Tillman et al. "Herstellungsm öglichkeiten von hochtemperaturbeständigen Verbunden nichtoxidischer Ingenieurkeramiken mittels verschiedener Lotkonzepte" "Brazing-High Temperature Brazing and Diffusion Welding"; Aachen, 27–29 June, DVS Verlag GmbH, Düsseldorf, p. 110–114, 1995, describes mixtures for brazing of non-oxide ceramics that essentially contain palladium and platinum with additions of iron, nickel or cobalt.

The reactive metal such as titanium may also be previously deposited on the silicon carbide using techniques such as "CVD" (Chemical Vapour Deposit) or "PVD" (Physical Vapour Deposit) as described in the document by M. Naka et al: "Ti-precoating effect on Wetting and Joining of Cu to SiC"; ISIJ International; Vol. 30 (1990), N° 12, p. 1108–1113) relating to the joining of parts in SiC with copper braze alloys.

Reactive brazing is adapted to the bonding of oxide ceramics such as alumina, as the reactivity is limited and the mechanical properties of the oxides formed is satisfactory.

In the case of non-oxide ceramics such as silicon nitride or carbide, the reactivity between the active elements and the ceramic is heightened; the latter induces the formation of fragile intermetallic compounds such as silicides and carbides in the case of SiC, of extensive porosity and fissure formation extending within the ceramic, which very seriously restricts the mechanical resistance of the bonds thus formed. These phenomena are mentioned in the document published by J. K. Boadi, T. Yano, T. Iseki: "Brazing of Pressureless Sintered (PLS) SiC using AgCuTi alloy", J of Materials Science, Vol. 22, 1987, p. 2431–2434 relating to the brazing of pressureless-sintered SiC or PLS SiC with itself using a braze alloy essentially containing Ag—Cu with titanium as reactive metal. In this document particular stress is laid upon the fragility of bonds with high titanium content and the formation of intermetallic compounds when temperature and contact time are increased.

Also, the melting point of the above-described braze alloys restricts the temperature of use to 600–700° C., which is largely insufficient for applications at high temperatures in the region of 1000° C. and over.

Another important problem encountered when joining ceramics is that these ceramics are brittle and practically lack any deformability even at high temperatures;

It is therefore most important, when joining ceramics, to limit the residual stresses which develop during cooling, due to a differential in dilation coefficient between the two parts to be joined if they are of a different nature, but also between the ceramic and the braze alloy when joining two ceramics of the same nature. Therefore, the thermal dilation coefficient of the braze alloy must correspond closely to that of the ceramic parts to be joined.

The Cu and Ag based alloy compositions commonly used are ductile but have a limited range of temperature of use as mentioned above and do not therefore provide a satisfactory answer to this problem.

It is in particular in order to bring a solution to this problem and to allow satisfactory joining of ceramics containing silicon that braze alloys have been developed containing metal suicides. In this respect, document U.S. Pat. No. 4,499,360 (DORNIER SYSTEM GmbH) which corresponds to patent documents DE-A-3 230 320; JP-A-59 (84) 09 7580 and to patent EP-A0 100 835 therefore describes a braze alloy for joining SiC based elements consisting of 20 to 45% by weight of cobalt and of 80 to 55% by weight of silicon. Although this document mentions refractory brazing of silicon carbide in general, this patent essentially refers to brazing elements in impregnated silicon carbide or reaction bound silicon carbide (RBSC) or Si—SiC, that is to say in a composite ceramic made up of silicon carbide (SiC) and up to 30% by weight of silicon (Si). The method of this document is used for example to join two tubes in SiSiC. The thickness of the joint obtained is always a small thickness of 5 to 10 microns.

Document U.S. Pat. No. 3,813,759 relates to joining silicon carbide based ceramics using braze alloys consisting of an alloy of silicon (at least 5%) with one or more metals such as germanium, iron, gold, platinum, nickel, palladium, chromium and titanium.

Despite the strong reactivity of silicon carbide with transition metals, the metal silicides mentioned above have the advantage of being nonreactive with silicon carbide when the composition is sufficiently rich in silicon. Also, these silicides offer good resistance to oxidation in air at high temperature.

However, the use of these silicides must be made with good prior knowledge of the interfaces between the silicides and SiC. While alloys of Co—Si, Ni—Si type for example have the property of forming a strong interface with SiC, this is not at all the case with the Fe—Si system for example as described in the document by S. Kalogeropoulou, L. Baud, N. Eustathopoulos: "Relationship between wettability and reactivity" in Fe/SiC system" which demonstrates the facts that Fe reacts strongly with silicon carbide and that additions of Si to the iron lead to a strong decrease in reactivity if the Si content exceeds a so-called critical value.

It therefore seems that the formulation of a braze alloy composition based on metal silicon is relatively unpredictable and that its properties cannot in any way be deduced from the properties of known braze alloys.

Also, as mentioned previously, the coefficient of the braze alloy must be adapted to that of the ceramic such as SiC, since these metal silicides which are defined compounds have no ductility.

Document U.S. Pat. No. 5,447,683 (GENERAL ATOMICS) describes joints for bonding, by high temperature brazing, ceramic blocks dense in silicon carbide. The braze alloys according to this document have a thermal dilation coefficient that is compatible with that of silicon carbide and contain silicon in a proportion that is necessarily less than 50% by weight and at least two other elements selected from Li, Be, B, Na, Mg, P, Sc, Tc, V, Cr, Mn, Fe, Co, Zn, Ga, Ge, As, Rb, Y, Sb, Te, Cs, Pr, Nd, Ta, N and Tl; Fe, V, Co, Cr being preferred. A particularly preferred braze alloy contains 10 to 45% Si and 30 to 65% Co.

Finally, document FR-A-2 707 196 (CEA) describes a method of joining molybdenum or tungsten either to one another or to ceramics such as silicon carbide, by brazing.

The braze alloy used comprises from 39 to 98% by weight of silicon and the braze alloys used in the examples comprises 49 and 62% by weight of silicon.

This document only relates to heterogeneous joining of ceramic/metal type and does not deal with the specific problems of homogeneous joining of two ceramics of the same nature such as SiC, or with the production of thick joints.

It was seen above that as for all technical ceramics, it is difficult to produce parts of complex shape in silicon carbide, and it is therefore often necessary to make structures using ceramic parts of simple shape which are then joined to obtain the final structure.

Also, the manufacture of technical ceramic parts with precise measurements has still not been properly mastered and machining such parts is unacceptable in particular for reasons of cost.

There does exist therefore a current need for a method providing strong bonding by brazing of two ceramics of the same nature such as SiC with a large space between the parts to be brazed, that is to say that there exists a need for a method allowing thick joints to be made.

Indeed, the methods of brazing and the braze alloy compositions described in the documents of the prior art are not at all adapted to the production of thick joints, and the specific problem of producing thick joints, namely with a thickness of 0.5 mm or over, is not at all raised.

In particular, none of the compositions of the prior art simultaneously meets the following criteria determined by inventors, which are of fundamental importance to produce structure components in ceramic such as SiC requiring thick joints.

1 The braze alloy must provide a strong bond between the two parts in ceramic such as silicon carbide, which implies a braze alloy composition that is non-reactive and of precise chemical composition.

2 The braze alloy must have a dilation coefficient adapted to SiC to eliminate any stresses within the joint during cooling and to provide against fissure formation which would harm the mechanical resistance of the bond.

3 The viscosity of the braze alloy must be controlled in order to have control over the filling of the thick joint with no porosity formation.

The purpose of the invention is therefore a method for joining by brazing parts or components in silicon carbide based materials, which among others meets all the above-mentioned criteria, which eliminates the disadvantages encountered with the methods of the prior art described above, and which allows thick joints to be produced.

This objective and others are reached according to the invention with a method for joining at least two parts in silicon carbide based materials by refractory brazing, in which these parts are placed in contact with an intermetallic Co—Si braze alloy and said parts and braze alloy are heated to a brazing temperature equivalent to the melting temperature of the braze alloy in order to form a refractory joint, characterized in that the intermetallic braze alloy comprises from 1 to 18% by weight of cobalt and from 82 to 99% by weight of silicon, and in that the joint obtained is a thick joint.

The method of the invention meets all the requirements and criteria mentioned above and does not have the disadvantages of the methods of the prior art and therefore allows the preparation of thick joints.

The inventors demonstrated in surprising manner that for the dilation coefficient of the braze alloy to be adapted to that of SiC for the Co—Si system, the proportion of Si in the braze alloy, whose dilation coefficient is close to SiC ($\alpha_{si}$ 5.10$^{-6}$ K$^{-1}$), needed to be 80% by weight or more.

Such a high proportion of silicon allowing thick joints to be made between two ceramic parts in SiC of the same nature is neither mentioned nor suggested in the prior art described previously.

The method according to the invention offers in particular the advantage of leading to refractory bonds able to resist against high temperatures reaching as high as 1000–1100° C. or over.

According to the invention, the formulations of braze alloy used must have a cobalt content of no more than 18% by weight and a silicon content of at least 80% by weight in order to obtain a dilation coefficient adapted to that of SiC.

To control the viscosity of the braze alloy it is also necessary to use a composition with non-congruent fusion of the Co—Si system, thereby excluding pure silicon, that is to say the silicon content should preferably be no more than 99% by weight.

A method using the compositions of braze alloy whose cobalt contents by weight lie within the above-mentioned ranges is easy to put in operation as these compositions are non-reactive on submicron scale and have very good wetting and adhesion properties with SiC.

The compositions meet the twofold criteria, among others, of dilation coefficient and viscosity in order to make thick joints—namely joints with a thickness generally in the region of 0.5 mm—having very good mechanical resistance determined for example by a very high $\sigma_y$ value.

In addition to the above-mentioned advantages, it may be indicated that the braze alloy used in the invention is a silicide whose high Si content strengthens its resistance to oxidation through the formation of a superficial silica layer.

The braze alloy used according to the invention also has the advantage of being little sensitive to corrosion, for example by oleum, nitric acid and oxidation.

In addition, unlike conventional reactive braze alloys, the quality of the atmosphere in the brazing oven is less critical, wetting is therefore immediate even in atmospheres having a non-negligible partial oxygen pressure, as for example with commercial quality Argon.

As other advantages of the method of the invention mention may also be made of:

short brazing times avoiding the enlargement of refractory metal alloy grains, unlike solid phase diffusion which requires much longer periods, great simplicity leading to low overall costs for the method, Other characteristics and advantages of the innovation shall be more clearly seen on reading the description below, given for illustrative purposes and therefore non-restrictive, with reference to the appended figures in which.

Figure 1:
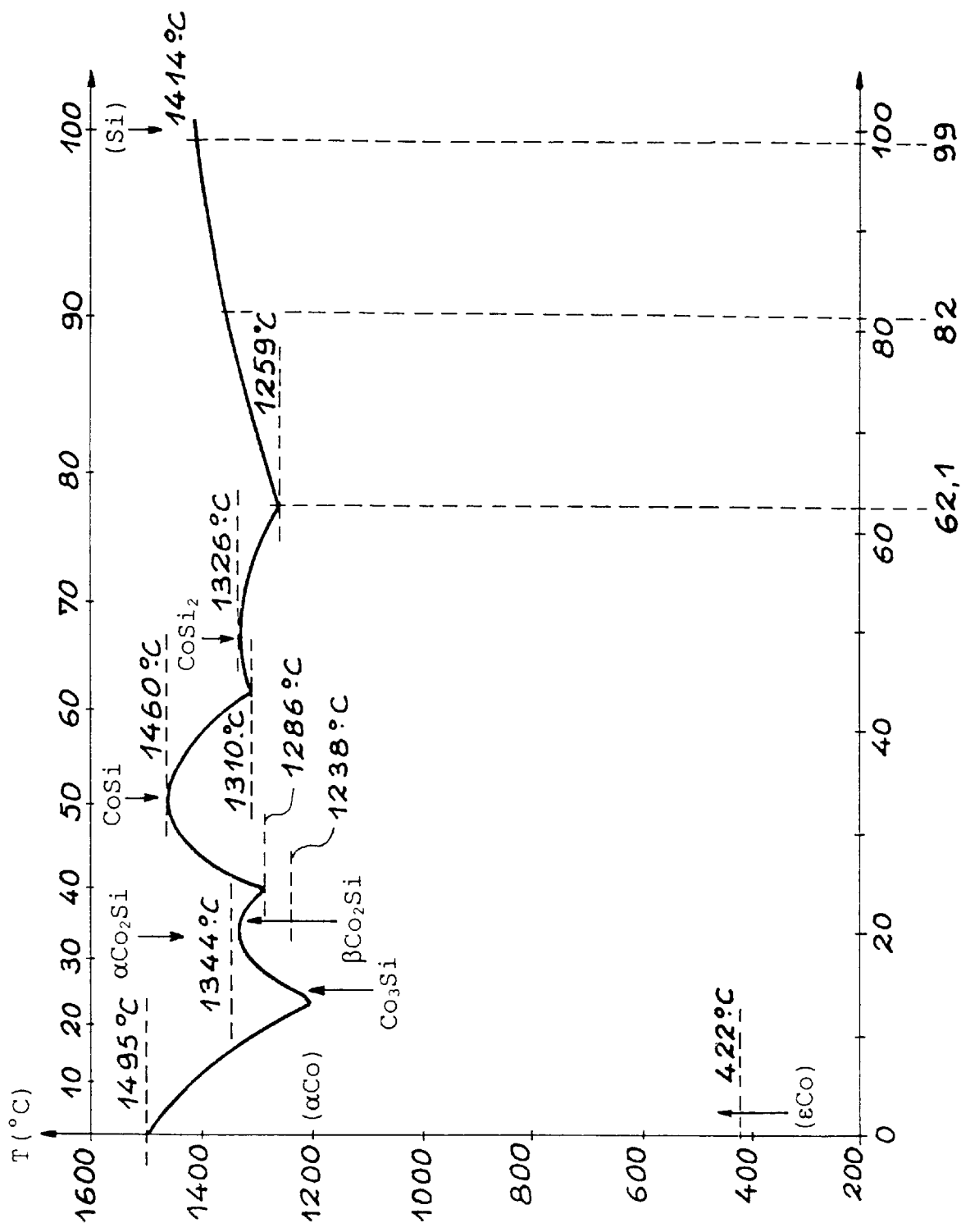
FIG. 1 represents part of the diagram of the Co—Si phase illustrating the different compositions of Si in atomic % and % by weight in the intermetallic Co—Si braze alloy and temperatures T in corresponding ° C.

The method of the invention consists first of all of synthesising an intermetallic composition containing silicon and cobalt in the desired proportions indicated above. Preferably, the Co content may range from 1 to 18% by weight and the Si content may range from 82 to 99% by weight, again preferably said contents shall be 10 and 90% by weight respectively.

Pure cobalt may for example be in wire form and pure silicon may for example be in piece form.

The cobalt and the silicon are placed for example in a crucible preferably in alumina and heated example to a temperature of 1420° to 1500° C., for example 1450° C. preferably in a vacuum, that is to say under a pressure of 10$^{-3}$ to 10$^{-4}$ Pa to melt the different constituents of the braze alloy and to obtain the required end intermetallic homogeneous compound.

The intermetallic braze alloy obtained is then ground in any suitable apparatus, for example in a mortar to obtain a powder whose grain diameter is for example between 0.05 and 0.1 mm.

This powder is placed in suspension in conventional manner in a liquid organic binder preferably relatively viscous, which breaks down for example between 100 and 300° C. leaving no trace. A cement of NICOBRAZ® type for example may be used.

The two surfaces of the parts in SiC-based material to be joined are cleaned in an organic solvent for example of ketone, ester, ether, alcohol type or a mixture thereof etc. a preferred solvent being acetone or an acetone-ethyl alcohol-ether mixture for example in the proportions of 1/3/,1/3/,1/3; then dried.

The parts in SiC-based materials that are to be joined are generally two in number, but it is also possible to join simultaneously a greater number of parts numbering as many as 100.

Under the term "part in SiC-based materials" is generally meant here any element, or entity of any shape which, after joining with one or more other parts, enters for example into structures of greater size.

Under the term "Sic-based material" is generally meant here all materials whose SiC content is 80% by weight or more.

This comprises for example pressureless sintered silicon carbide ("PLS-SiC"), Si impregnated silicon carbide (called SiSiC or RBSC containing 5 to 20% Si), porous recrystallized silicon carbide (called RSiC), silicon graphite (C-SiC) made up of graphite coated with a layer of SiC having a thickness of 0.1 to 1 mm for example, and SiC/SiC composites etc.

One unexpected advantage of the method according to the present invention and of the braze alloy compositions used in this method is precisely that they allow the brazing of porous ceramics such as SiC/SiC composites, which would not be possible with a braze alloy whose viscosity is uncontrolled such as those prepared in the prior art.

The two or more parts to be joined may be in the same silicon carbide based material for example in PLS (Pressureless Sintered) α-SiC, or in composite SiC—SiC, or each of the parts may be in a different material.

The surfaces of the areas of the parts that are to be joined are coated with the braze alloy suspension.

The parts then ready to be brazed are placed in an oven in a vacuum or in a neutral gas atmosphere.

Generally the vacuum is a secondary vacuum, that is to say that the pressure is from 10$^{-3}$ to 10$^{-4}$ Pa.

Preferably the neutral gas is argon or nitrogen.

The invention even permits the use of commercial quality argon having a non-negligible partial oxygen pressure.

According to the invention, the aim is to obtain a "thick" joint, that is to say that the two or more parts to be brazed/joined are positioned with a large space between them, for example of 0.1 to 0.5 mm at the start of the process.

A first temperature stage is carried out which allows general gas release and evaporation of the binding material sometimes called "debinding"; while a second heating stage allows actual brazing properly so called;

The first stage is conducted for example at a temperature of 200 to 300° C., preferably of 300° C. for a period of for example 0.5 to 1 hour.

The second stage is conducted at a temperature corresponding to the melting temperature of the chosen composition; this temperature, easily determined by the phase diagram (see FIG. 1) is therefore preferably 1350 to 1400° C. or again preferably 1390° C.

Such melting temperature of the compositions, according to a further advantage of the method of the invention, means that the bonded parts can be used in air at temperatures reaching as high as 1000° C. and even higher.

The brazing period, that is to say the thermal cycle to achieve bonding is, according to the invention, generally short; this stage time is for example less than 10 min. and preferably from 5 to 10 min.

Oven pressure is generally a secondary vacuum pressure of $10^{-3}$ to $10^{-4}$ Pa.

The bond is then cooled to room temperature at the rate of 5° C. for example per minute.

According to the invention, the final joint obtained between the two parts is a so-called "thick joint", that is. to say it has a thickness of for example 0.1 to 0.5 mm.

Bonds of parts in silicon carbide comprising thick joints prepared by the method of the invention make it possible to produce with great precision structures, apparatus and components of complex shape having high temperatures of use reaching as high as 1000° C. and even higher.

It is known that the mechanical properties of silicon carbide:

great hardness low dilation coefficient high yield resistance good heat shock resistance and its very good conductivity make it an indispensable material for present and future industrial applications at high temperature.

Also, SiC has high chemical resistance to various acids, including hydrofluoric acid, and very good resistance to oxidation in air at high temperatures reaching as high as 1300° C.

All these properties make SiC a material of choice, in particular for the production of ceramic exchangers in heat engineering and chemical engineering. Therefore, among the applications of the bonds obtained with the method of the invention, mention may also be made for example of heat exchangers, burners, reactors, pump linings, oven resistances in air at average temperature, but also combustion chambers for motor vehicles, composites for the aeronautics industry and all structures intended for corrosive environments at temperatures in the region of 1000° C.

The invention shall be described below by means of the following examples that are evidently given for illustrative purposes and are non-restrictive.

EXAMPLE 1

This example concerns the mechanical resistance of a bond between two parts in "PLS α-SiC" (Pressureless Sintered α-SiC), that is to say in α silicon carbide sintered without pressure obtained by using the method of the invention with a cobalt silicide braze alloy Co—Si.

a) Production of the Co—Si Braze Alloy:

Firstly an intermetallic composition containing 90% by weight of Si and 10% by weight of Co is synthesised from pure cobalt in wire form and pure silicon in piece form.

The cobalt and silicon are placed in a crucible in alumina and heated in a vacuum to 1450° C. for 5 minutes to melt the different constituents and obtain the desired, homogeneous end compound. The intermetallic braze alloy obtained is hard and brittle.

This braze alloy is ground in a mortar to obtain a powder whose grain diameter is between 0.05 and 0.1 mm.

This powder is subsequently placed in suspension in a viscous organic binder which breaks down between 100 and 300° C. leaving no trace (Nicobraz® cement).

Preparation of the Parts to be Joined

The two surfaces of SiC parts to be joined are cleaned in an organic solvent with the following composition: 1/3 acetone, 1/3 ethyl alcohol, 1/3 ether, dried and coated with the braze alloy suspension.

c) Brazing

The two parts in SiC ready to be brazed are placed in an oven in which a secondary vacuum is made.

A first heating stage is conducted firstly at 300° C. for one hour to achieve "debinding", that is to say to release gases and eliminate the solvent, then brazing properly so called is carried out by conducting a second heating stage at 1400° C. for 5 minutes under a secondary vacuum pressure of $10^{-5}$ mbar.

The bond obtained is then cooled to room temperature at the rate of 5° C. per minute.

The joint obtained according to the invention is a thick joint with a thickness of 0.5 mm.

d) Mechanical Testing of the Bond

A mechanical shearing/compression test was carried out on the bond obtained.

Yield of the bond was observed at over 98 MPa with pure shearing ($\sigma_y$=98 MPa).

Figure 2:
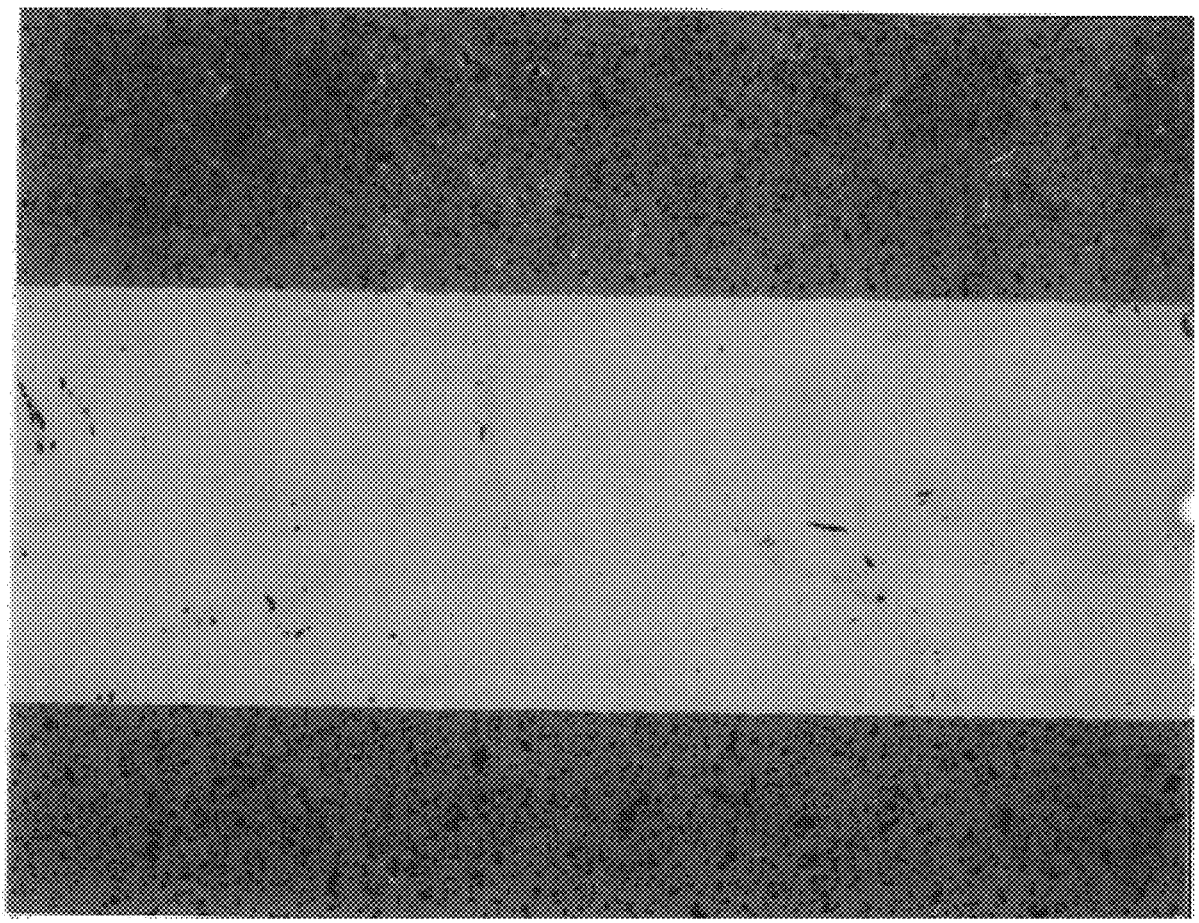
FIG. 2 is a cross section photograph of a joint according to the invention, made with a braze alloy comprising 90% by weight of Si, between two parts in "PLS"-SiC.

Cross section analysis of the joint obtained showed that it was free of fissures and pores (see FIG. 2).

EXAMPLE 2

This example concerns the mechanical resistance of a bond between two parts in SiC—SiC composite, obtained using the method of the invention with a cobalt silicide based braze alloy Co—Si.

a) Production of the Braze Alloy in Co—Si

The synthesis of the Si 90% by weight and Co 10% by weight compound, the preparation of the braze alloy powder and suspension are identical to those described under example 1.

b) Preparation of the Parts to be Joined

The preparation of the parts to be joined is identical to that described under example 1 c) Brazing

The two parts in SiC ready for brazing are placed in an oven in which a secondary vacuum is made.

A first heating stage is firstly carried out for one hour to achieve "debinding", then actual brazing is carried out by conducting a second heating stage at a temperature of 1400° C. for 5 minutes under a secondary vacuum pressure of $10^{-5}$ mbar.

The bond obtained is then cooled to room temperature at the rate of 5° C. per minute;

The joint obtained according to the invention is a thick joint with a thickness of 0.1 mm.

d) Mechanical Testing of the Bond

A mechanical shearing/compression test was carried out on the bond obtained. Yield of the bond was observed at over 85 MPa for pure shearing ($\sigma_y$=85 MPa)

EXAMPLE 3 (COMPARATIVE)

This example concerns the mechanical resistance of a bond between two parts in "PLS α-SiC" (PressureLess Sintered α-SiC), that is to say in α silicon carbide sintered without pressure, obtained with a method that does not comply with the invention using a cobalt silicide braze alloy whose silicon content lies outside the range specifically recommended in the present application.

a) Production of the Co—Si Braze Alloy

This intermetallic composition containing 62% by weight of Si and 38% by weight of Co—that is not say not conforming with the present invention—is first synthesised from pure cobalt in wire form and pure silicon is piece form.

The cobalt and silicon are placed in a crucible in alumina and heated in a vacuum to 1450° C. for 5 minutes to melt the different constituents and obtain the desired homogeneous end compound. The braze alloy obtained is hard and brittle.

This braze alloy is ground in a mortar to obtain a powder whose grain diameter is between 0.05 and 0.1 mm.

This powder is subsequently placed in suspension in a viscous organic binder (Nicobraz® cement).

b) Preparation of the Parts to be Joined

The two surfaces of the parts in SiC to be joined are cleaned in an organic solvent having the following composition: 1/3 acetone, 1/3 ethanol, 1/3 ether, dried and coated with the braze alloy suspension.

c) Brazing

The two parts in SiC ready for brazing are placed in an oven in which a secondary vacuum is made.

A first heating stage is firstly conducted to achieve "debinding", then brazing properly so called is carried out by conducting a second heating stage at a temperature of 1300° C. for 5 minutes under a secondary vacuum pressure of $10^{-5}$ mbar.

The bond obtained is then cooled to room temperature at the rate of 5° C. per minute. The joint obtained is a thick joint with a thickness of 0.3 mm.

d) Evaluation of the Joint Obtained

Cross section analysis of the joint so prepared using the above method not complying with the present invention shows a strong presence of porosities due to infiltration of the braze alloy into the SiC and fissures related to the differential of the dilation coefficient between the braze alloy and the SiC.

The mechanical resistance of the joint is insufficient as is shown by a test giving a $\sigma_r$ value of less than 10 MPa.

We claim:

1. Method of joining at least two parts in silicon carbide based materials by refractory brazing in which said parts are brought into contact with an intermetallic braze alloy and said parts and said braze alloy are heated to a brazing temperature equivalent to the melting temperature of the braze alloy in order to form a refractory joint wherein the intermetallic braze alloy comprises from 1 to 18% by weight of cobalt and from 82 to 99% by weight of silicon, and in that the joint obtained is a thick joint.

2. Method in accordance with claim 1, wherein said silicon carbide based materials have a silicon carbide content of 80% or more.

3. Method in accordance with claim 2, wherein the silicon carbide based materials are selected from pressureless sintered silicon carbide ("PLS-Si"), Si impregnated silicon carbide ("SiSiC" or "RBSC"), porous recrystallized silicon carbide ("RSiC"), silicon graphite ("C—SiC") made up of graphite and coated with a SiC layer, and SiC/SiC composites.

4. Method in accordance with any of claims 1 to 3, wherein the braze alloy comprises 90% by weight of silicon and 10% by weight of cobalt.

5. Method in accordance with claim 1, characterized in that brazing is conducted at a temperature of 1350° C. to 1400° C.

6. Method in accordance with claim 1, wherein the thick joint has a thickness of 0.1 to 0.5 mm.

7. Method in accordance with claim 1, wherein a Co—Si powder is formed, this powder is placed in suspension in an organic binder, and in that the parts of the elements to be joined are coated with the suspension obtained.

8. Method in accordance with claim 2, wherein a Co—Si powder is formed, this powder is placed in suspension in an organic binder, and in that the parts of the elements to be joined are coated with the suspension obtained.

9. Method in accordance with claim 3, wherein a Co—Si powder is formed, this powder is placed in suspension in an organic binder, and in that the parts of the elements to be joined are coated with the suspension obtained.

10. Method in accordance with claim 4, wherein a Co—Si powder is formed, this powder is placed in suspension in an organic binder, and in that the parts of the elements to be joined are coated with the suspension obtained.

11. Method in accordance with claim 5, wherein a Co—Si powder is formed, this powder is placed in suspension in an organic binder, and in that the parts of the elements to be joined are coated with the suspension obtained.

12. Method in accordance with claim 6, wherein a Co—Si powder is formed, this powder is placed in suspension in an organic binder, and in that the parts of the elements to be joined are coated with the suspension obtained.

* * * * *